(12) United States Patent
Nagae (10) Patent No.: US 7,808,728 B2
(45) Date of Patent: Oct. 5, 2010

(54) LENS BARREL AND IMAGE PICKUP APPARATUS

(75) Inventor: Ryuichi Nagae, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/495,226

(22) Filed: Jun. 30, 2009

(65) Prior Publication Data

US 2010/0002309 A1 Jan. 7, 2010

(30) Foreign Application Priority Data

Jul. 2, 2008 (JP) .............................. 2008-173271

(51) Int. Cl.
G02B 7/02 (2006.01)
G02B 15/14 (2006.01)

(52) U.S. Cl. ...................... 359/822; 359/700; 359/811; 359/819

(58) Field of Classification Search ......... 359/694–704, 359/819–824; 396/73–75, 349, 373
See application file for complete search history.

(56) References Cited

U.S. PATENT DOCUMENTS

| 6,469,840 | B2 * | 10/2002 | Nomura et al. ............. 359/699 |
| 6,952,526 | B2 | 10/2005 | Nomura ........................ 396/73 |
| 6,959,148 | B2 | 10/2005 | Nomura ........................ 396/73 |
| 6,963,694 | B2 | 11/2005 | Nomura ........................ 396/73 |
| 6,965,733 | B1 | 11/2005 | Nomura ........................ 396/72 |
| 6,978,088 | B2 | 12/2005 | Nomura ...................... 396/349 |
| 6,987,930 | B2 | 1/2006 | Nomura ........................ 396/85 |
| 6,990,291 | B2 | 1/2006 | Nomura ........................ 396/73 |
| 7,010,224 | B2 | 3/2006 | Nomura ........................ 396/85 |
| 7,025,512 | B2 | 4/2006 | Nomura ...................... 396/349 |
| 7,027,727 | B2 | 4/2006 | Nomura ........................ 396/72 |
| 7,031,603 | B2 | 4/2006 | Nomura ........................ 396/72 |
| 7,031,604 | B2 | 4/2006 | Nomura ........................ 396/75 |
| 7,035,535 | B2 | 4/2006 | Nomura ........................ 396/73 |
| 7,039,308 | B2 | 5/2006 | Nomura ........................ 396/72 |
| 7,039,311 | B2 | 5/2006 | Nomura ........................ 396/73 |
| 7,043,154 | B2 | 5/2006 | Nomura ...................... 396/350 |
| 7,050,713 | B2 | 5/2006 | Nomura ........................ 396/75 |
| 7,058,293 | B2 | 6/2006 | Nomura ........................ 396/75 |

(Continued)

FOREIGN PATENT DOCUMENTS

JP 2004-085932 A 3/2004
JP 2007-219435 A 8/2007

*Primary Examiner*—Mohammed Hasan
(74) *Attorney, Agent, or Firm*—Cowan, Liebowitz & Latman, P.C.

(57) ABSTRACT

A lens barrel that can be reduced in size and improve drive accuracy. A first cylindrical member is fixed. A rotatable second cylindrical member cam-engages with the first cylindrical member so as to move in an axial direction of an axial center. A third cylindrical member engaging with the first cylindrical member so as not to rotate can move in the axial direction by the rotation of the second cylindrical member. A fourth cylindrical member cam-engaging with the third cylindrical member engages with the second cylindrical member so as to move in the axial direction by following the rotation of the second cylindrical member. A lens holding member engaging with the third cylindrical member so as not to rotate relative to the third cylindrical member can move in the axial direction by cam-engaging with the fourth cylindrical member.

8 Claims, 7 Drawing Sheets

U.S. PATENT DOCUMENTS

| | | | |
|---|---|---|---|
| 7,068,929 B2 | 6/2006 | Nomura | 396/73 |
| 7,079,761 B2 | 7/2006 | Nomura | 396/72 |
| 7,079,762 B2 | 7/2006 | Nomura | 396/73 |
| 7,085,486 B2 | 8/2006 | Nomura | 396/72 |
| 7,088,916 B2 | 8/2006 | Nomura | 396/73 |
| 7,097,367 B2 | 8/2006 | Nomura | |
| 7,106,961 B2 | 9/2006 | Nomura | 396/373 |
| 7,131,772 B2 | 11/2006 | Nomura | 396/349 |
| 7,167,644 B2 | 1/2007 | Nomura | 396/73 |
| 7,229,223 B2 | 6/2007 | Nomura | 396/349 |
| 7,230,777 B2 * | 6/2007 | Ye | 359/811 |
| 7,289,725 B2 | 10/2007 | Nomura | 396/73 |
| 2004/0042089 A1 | 3/2004 | Nomura | |
| 2004/0042090 A1 | 3/2004 | Nomura | |
| 2004/0042091 A1 | 3/2004 | Nomura | |
| 2004/0042092 A1 | 3/2004 | Nomura | |
| 2004/0042093 A1 | 3/2004 | Nomura | |
| 2004/0042095 A1 | 3/2004 | Nomura | |
| 2004/0042096 A1 | 3/2004 | Nomura | |
| 2004/0042775 A1 | 3/2004 | Nomura | |
| 2004/0042776 A1 | 3/2004 | Nomura | |
| 2004/0042778 A1 | 3/2004 | Nomura | |
| 2004/0051967 A1 | 3/2004 | Nomura | |
| 2004/0051968 A1 | 3/2004 | Nomura | |
| 2004/0051969 A1 | 3/2004 | Nomura | |
| 2004/0051970 A1 | 3/2004 | Nomura | |
| 2004/0051972 A1 | 3/2004 | Nomura | |
| 2004/0051981 A1 | 3/2004 | Nomura | |
| 2004/0062536 A1 | 4/2004 | Nomura | |
| 2004/0062537 A1 | 4/2004 | Nomura | |
| 2004/0076418 A1 | 4/2004 | Nomura | |
| 2004/0091253 A1 | 5/2004 | Nomura | |
| 2004/0141735 A1 | 7/2004 | Nomura | |
| 2004/0141736 A1 | 7/2004 | Nomura | |
| 2004/0141737 A1 | 7/2004 | Nomura | |
| 2004/0151490 A1 | 8/2004 | Nomura | |
| 2005/0169621 A1 | 8/2005 | Nomura | |
| 2006/0078322 A1 | 4/2006 | Nomura | |
| 2006/0115262 A1 | 6/2006 | Nomura | |
| 2006/0193625 A1 | 8/2006 | Nomura | |
| 2007/0195437 A1 | 8/2007 | Yasuda | |

* cited by examiner

LENS BARREL AND IMAGE PICKUP APPARATUS

BACKGROUND OF THE INVENTION

1. Field of the Invention

The present invention relates to a lens barrel and an image pickup apparatus and, more particularly, to a collapsible lens barrel and an image pickup apparatus having the lens barrel.

2. Description of the Related Art

As a lens barrel mounted in an image pickup apparatus such as a film camera using silver halide film or a digital camera using an image pickup element, a collapsible lens barrel having an advancing cam mechanism is known.

The collapsible lens barrel is housed in a casing of an image pickup apparatus by being retracted along an optical axis of an image pickup optical system when photographing is not performed, i.e., when the power supply for the image pickup apparatus is off, and is projected toward a subject by being extended along the optical axis when photographing is performed, i.e., when the power supply for the image pickup apparatus is on. According to such an arrangement, the size of the lens barrel can be reduced and the zoom ratio can be easily changed through adjustment of the focal length of the image pickup optical system.

In recent years, there has been a demand for further reducing the size of extendable lens barrels. In general, reduction of the size of an extendable lens barrel causes the zoom ratio variable function to degrade, since the amounts of movement of lens groups constituting an image pickup optical system are reduced.

The zoom ratio variable function is useful in photography, for example, in that it enables changing the angle of view as a photographable region. Therefore the development of techniques relating to internal mechanisms of extendable lens barrels is being pursued to achieve a further reduction in size of extendable lens barrels without degrading the zoom ratio variable function.

For example, a technique to reduce the size of a cam ring while maintaining a desired movable distance of a lens group in such a manner that a second lens barrel is transferred from one cam groove provided in a moving cam ring to another cam groove provided in the moving cam ring is known (see, for example, Japanese Laid-Open Patent Publication (Kokai) No. 2004-85932).

A technique to secure the desired movable distance of a lens group in a mechanism for a zoom lens barrel by setting the movable distance of the lens group to the sum of a movable distance by drive of a second drive member and a movable distance of the second drive member by a first drive member is also known (see, for example, Japanese Laid-Open Patent Publication (Kokai) No. 2007-219435).

In the technique disclosed in Japanese Laid-Open Patent Publication (Kokai) No. 2004-85932, however, play is positively provided between three cam followers of the second lens barrel and three cam grooves engaging with the cam followers in order to smoothly perform transfer between the cam grooves. This structure entails a problem in that the accuracy with respect to eccentricity for example deteriorates and a reduction in drive accuracy results.

In the technique disclosed in Japanese Laid-Open Patent Publication (Kokai) No. 2007-219435, a cam rotation transmission mechanism is complicated and the construction of a mechanism for driving the second drive member is also complicated. It is, therefore, difficult to achieve a reduction in size of the lens barrel while maintaining the desired zoom ratio variable function. There is also a possibility of a reduction in the drive accuracy because the drive accuracy can be largely influenced by parts accuracies.

SUMMARY OF THE INVENTION

The present invention provides a lens barrel capable of improving the drive accuracy and being reduced in size while maintaining the desired zoom ratio variable function and an image pickup apparatus having the lens barrel.

Accordingly, in a first aspect of the present invention, there is provided a lens barrel comprising a first cylindrical member fixed, a second cylindrical member rotatably disposed inside the first cylindrical member in a diametral direction and capable of moving in an axial direction of an axial center by cam-engaging with the first cylindrical member, a third cylindrical member disposed inside the second cylindrical member in a diametral direction, engaging with the first cylindrical member so as not to be rotatable relative to the first cylindrical member, the third cylindrical member capable of moving in the axial direction of the axial center by the rotation of the second cylindrical member, a fourth cylindrical member disposed inside the third cylindrical member in a diametral direction, cam-engaging with the third cylindrical member, engaging with the second cylindrical member so as not to be rotatable relative to the second cylindrical member, the fourth cylindrical member capable of moving in the axial direction of the axial center by the rotation of the second cylindrical member, and a lens holding member that holds an image pickup lens and is disposed inside the fourth cylindrical member in a diametral direction, the lens holding member capable of moving in an axial direction of an optical axis of the image pickup lens by cam-engaging with the fourth cylindrical member and engaging with the third cylindrical member so as not to be rotatable relative to the third cylindrical member.

According to the first aspect of the present invention, the construction of the lens barrel can be simplified without reducing the amounts of movement of a lens group constituting an image pickup optical system. In this way, the drive accuracy of the zooming mechanism can be improved while maintaining the zoom ratio variable function of the lens barrel. The size of the lens barrel can also be reduced.

In a second aspect of the present invention, there is provided an image pickup apparatus comprising the lens barrel according to the first aspect of the present invention.

The features and advantages of the invention will become more apparent from the following detailed description taken in conjunction with the accompanying drawings.

DETAILED DESCRIPTION OF THE PREFERRED EMBODIMENTS

The present invention will now be described in detail below with reference to the accompanying drawings showing preferred embodiments thereof.

Figure 1:
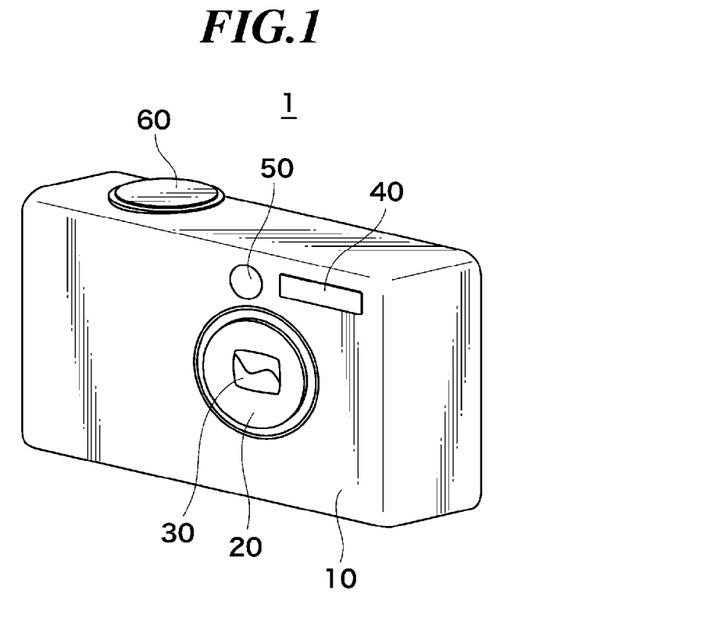
FIG. 1 is a perspective view schematically showing the entire construction of an image pickup apparatus incorporating a lens barrel according to an embodiment of the present invention.

FIG. 1 is a perspective view schematically showing the entire construction of an image pickup apparatus incorporating a lens barrel according to an embodiment of the present invention.

As shown in FIG. 1, a camera 1, which is an image pickup apparatus, is provided with a casing 10, a lens barrel 20, a lens barrier unit 30, a light emitting window unit 40, a finder window 50 and a release button 60.

The casing 10 has the shape of a generally rectangular box. The lens barrel 20 is disposed at the front surface side of the casing 10. A plurality of cylindrical members constituting the lens barrel 20 are housed in the casing 10 when the power supply is off. The lens barrier 30 is disposed in the front surface of the lens barrel 20. The lens barrier unit 30 opens or closes the optical path in the lens barrel 20 according to the on/off state of the power supply for the camera 1.

The light emitting window unit 40 is disposed in the front surface of the casing 10 and in the vicinity of an upper portion of the lens barrel 20. The light emitting window unit 40 is part of the strobe device which applies illumination light to a subject. In the front surface of the casing 10 and in the vicinity of the light emitting window unit 40, the finder window 50 for enabling a photographer to check the angle of view at which the photographer takes an image or to perform focusing is disposed.

The release button 60 is disposed in the upper surface of the casing 10. The release button 60 is a button for starting an image pickup preparation operation and an image pickup operation. "Image pickup preparation operation" refers, for example, to a focusing operation and a photometry operation, and "image pickup operation" refers to an operation to perform exposure on a film or an image pickup element such as a CCD. The construction of the camera 1 shown in FIG. 1 is a typical camera construction. The present invention is not limited to the construction shown in FIG. 1.

Figure 2:
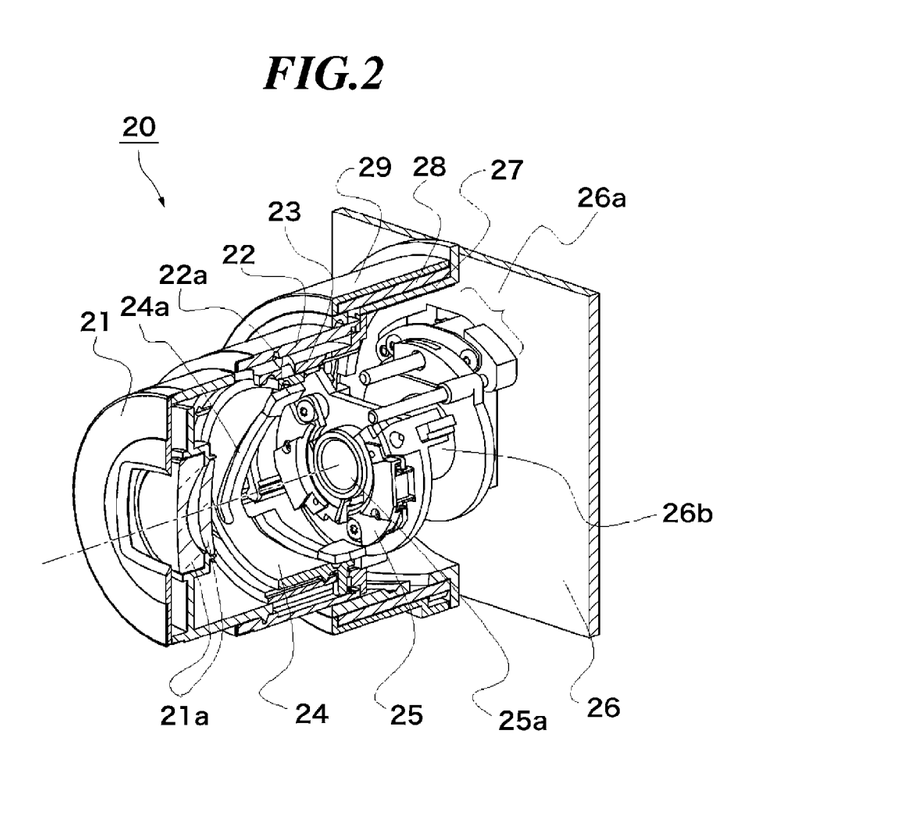
FIG. 2 is a perspective view schematically showing the internal construction of the lens barrel by partially cutting away part of the members of the lens barrel.

The construction of the lens barrel 20 will be described with reference to FIG. 2. FIG. 2 is a perspective view schematically showing the internal construction of the lens barrel 20 by partially cutting away part of the members of the lens barrel 20.

An image pickup optical system arranged to change the zoom ratio by a first lens group and a second lens group on the subject side and to perform focusing by a third lens group on the image formation surface side is applied to the lens barrel 20.

As shown in FIG. 2, the lens barrel 20 is provided with a base unit 26 fixed on the casing 10, a fixed cylinder 27 (first cylindrical member) fixed on the base unit 26, a rotary drive cylinder 28 (sixth cylindrical member) and a lens barrel cover 29 which are successively arranged outside the fixed cylinder 27 in the diametral direction so as to cover the fixed cylinder 27. Inside the fixed cylinder 27, a cam cylinder 22 (second cylindrical member), a first group cylinder 21 (fifth cylindrical member), a straight-moving cylinder 23 (third cylindrical member), a second group drive cylinder 24 (rotary cylinder (fourth cylindrical member)) and a second group lens holder 25 (lens holding member) are provided one inside another in the diametral direction.

The base unit 26 is provided with an image pickup element (not shown) such as a CCD or CMOS and a well-known focusing mechanism 26a and a focusing lens 26b for focusing on the image pickup element. Each of the fixed cylinder 27, the rotary drive cylinder 28, the lens barrel cover 29, the cam cylinder 22, the first group cylinder 21, the straight-moving cylinder 23 and the second group drive cylinder 24 is a circular cylindrical member. These circular cylindrical members are disposed so that their axial centers are aligned with the optical axis of the image pickup optical system indicated by a dot-dash line in FIG. 2. That is, these circular cylindrical members are coaxially disposed.

With respect to each circular cylindrical member, "axial center" denotes an axis passing through the center of the circular cylindrical member in the diametral direction and extending in the longitudinal direction. In the lens barrel 20, the axes of the circular cylindrical members are aligned with the optical axis of the image pickup optical system. However, the lens barrel according to the present invention is not limited to such a construction. Since the optical axis and the axial centers are aligned with each other in the embodiment of the present invention, "optical axis" is used instead of "axial center" in the following description with respect to the circular cylindrical members.

The structure of each constituent member of the lens barrel 20 and the structure fabricated by assembling the constituent members will be described with reference to FIGS. 3A to 5. In FIGS. 3A to 5, as well as in FIG. 2, the optical axis of the image pickup optical system of the lens barrel 20 is indicated by a dot-dash line. In the following description, the subject side is assumed to be the front in the optical axis direction, and the base unit 26 side is assumed to be the rear in the optical axis direction. "Axial direction" denotes a direction in which an axis extends. Correspondingly, "optical axis direction" denotes a direction in which the optical axis extends.

The first group cylinder 21, the cam cylinder 22 and the straight-moving cylinder 23 will first be described with reference to FIGS. 3A and 3B.

Figure 3A:
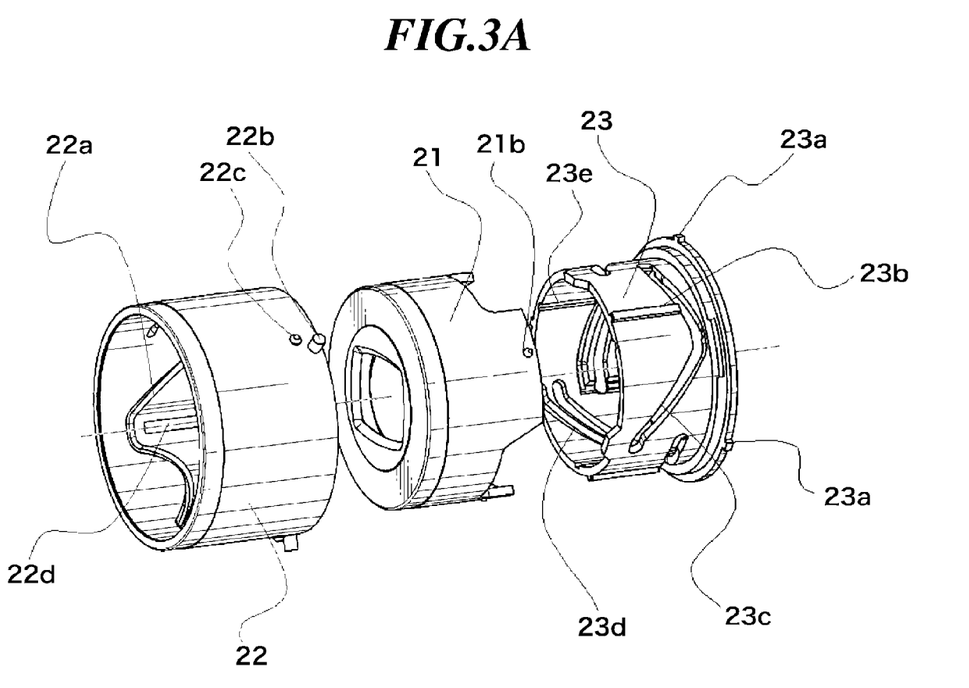
FIGS. 3A and 3B are exploded perspective views schematically showing the construction of a first group cylinder, a cam cylinder and a straight-moving cylinder.
Figure 3B:
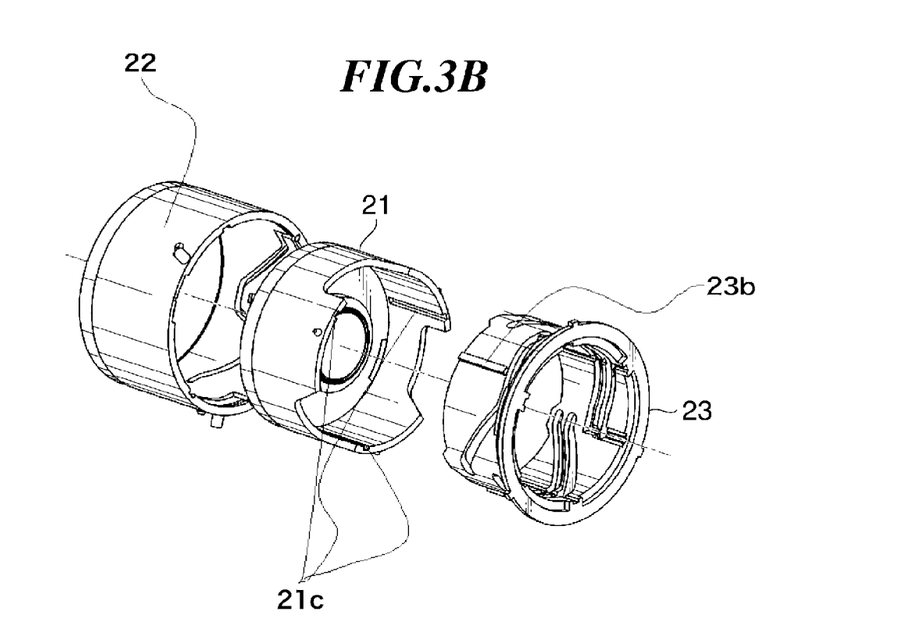

FIGS. 3A and 3B are exploded perspective views schematically showing the construction of the first group cylinder 21, the cam cylinder 22 and the straight-moving cylinder 23. FIG. 3A shows a view seen from the oblique front in the optical axis direction. FIG. 3B shows a view seen from the oblique rear in the optical axis direction.

Referring to FIGS. 3A and 3B, when the lens barrel 20 is extended, the first group cylinder 21 is fully projected from the base unit 26 to form a front end portion in the optical axis direction. A cover with the lens barrier unit 30 (not shown in FIGS. 3A and 3B; see FIG. 1) disposed so as to intersect the optical axis is attached to the end portion of the first group cylinder 21 at the front side in the optical axis direction. Also, first group image pickup lenses 21a (not shown in FIGS. 3A and 3B; see FIG. 6) are provided inside the first group cylinder 21 in the diametral direction and at the rear of the lens barrier unit 30 in the optical axis direction.

In the inner peripheral surface of the first group cylinder 21, three rotation prohibiting cam grooves 21c in straight form extending in the optical axis direction are formed at generally equal intervals in the circumferential direction. On the outer peripheral surface of the first group cylinder 21, three cam pins 21b projecting outward in the diametral direction are formed at generally equal intervals in the circumferential direction.

In the inner peripheral surface of the cam cylinder 22 disposed outside in the diametral direction of the first group cylinder 21, three first group rotation cam grooves 22a in curved form extending in the circumferential direction and three drive grooves 22d in straight form extending in the optical axis direction are respectively formed at generally equal intervals in the circumferential direction.

The first group rotation cam grooves 22a are slidably engaged with the cam pins 21b formed on the first group cylinder 21 to coordinate the cam cylinder 22 and the first group cylinder 21. The drive grooves 22d are slidably engaged with the drive pins 24c formed on the outer peripheral surface of the second group drive cylinder 24 to rotate the second group drive cylinder 24 about the optical axis, as described below (see FIGS. 4 and 6).

With respect to the lens barrel 20, "the second group drive cylinder 24 rotates about the optical axis" has the same meaning as "the second group drive cylinder 24 rotates about its axial center". This definition is also applied to the circular cylindrical members other than the second group drive cylinder 24 capable of moving in the same way. In a lens barrel having, unlike the lens barrel 20, a structure in which the axial center of a predetermined cylindrical member is not aligned with the optical axis of the image pickup optical system, the circular cylindrical member rotates about its axial center and does not rotate about the optical axis.

On the outer peripheral surface of the cam cylinder 22, three cam pins 22c extending outward in the diametral direction and three dive pins 22b extending outward in the diametral direction are respectively formed at generally equal intervals in the circumferential direction.

The straight-moving cylinder 23 disposed inside the first group cylinder 21 in the diametral direction is rotatably attached to the cam cylinder 22 by a bayonet structure. Thus, the straight-moving cylinder 23 forms a unit integrally with the cam cylinder 22 and supported by the cam cylinder 22 (see FIG. 6).

In the inner peripheral surface of the straight-moving cylinder 23, three cam grooves 23d in curved form extending in the circumferential direction and three rotation prohibiting cam grooves 23e in straight form (rotation prohibiting cams) extending in the optical axis direction are respectively formed generally at equal intervals in the circumferential direction. The rotation prohibiting cam grooves 23e prohibit the second group lens holder 25 described below from rotating.

On the outer peripheral surface of the straight-moving cylinder 23, three rotation prohibiting keys 23b in straight form extending in the optical axis direction are formed generally at equal intervals in the circumferential direction. The rotation prohibiting keys 23b are slidably engaged with the rotation prohibiting cam grooves 21c of the first group cylinder 21 to prohibit the first group cylinder 21 from rotating (see FIG. 6).

Further, in the straight-moving cylinder 23, three through holes 23c in curved form extending in the circumferential direction are formed generally at equal intervals in the circumferential direction. A mount portion projecting outward in the diametral direction is formed on the end portion of the straight-moving cylinder 23 at the rear side in the optical axis direction. On the outer peripheral surface of the mount portion, three rotation prohibiting keys 23a projecting further outward in the diametral direction and prohibited by the fixed cylinder 27 from rotating are formed at equal intervals in the circumferential direction.

The second group drive cylinder 24 and the second group lens holder 25 disposed inside the straight-moving cylinder 23 in the diametral direction will be described in detail with reference to FIG. 4.

Figure 4:
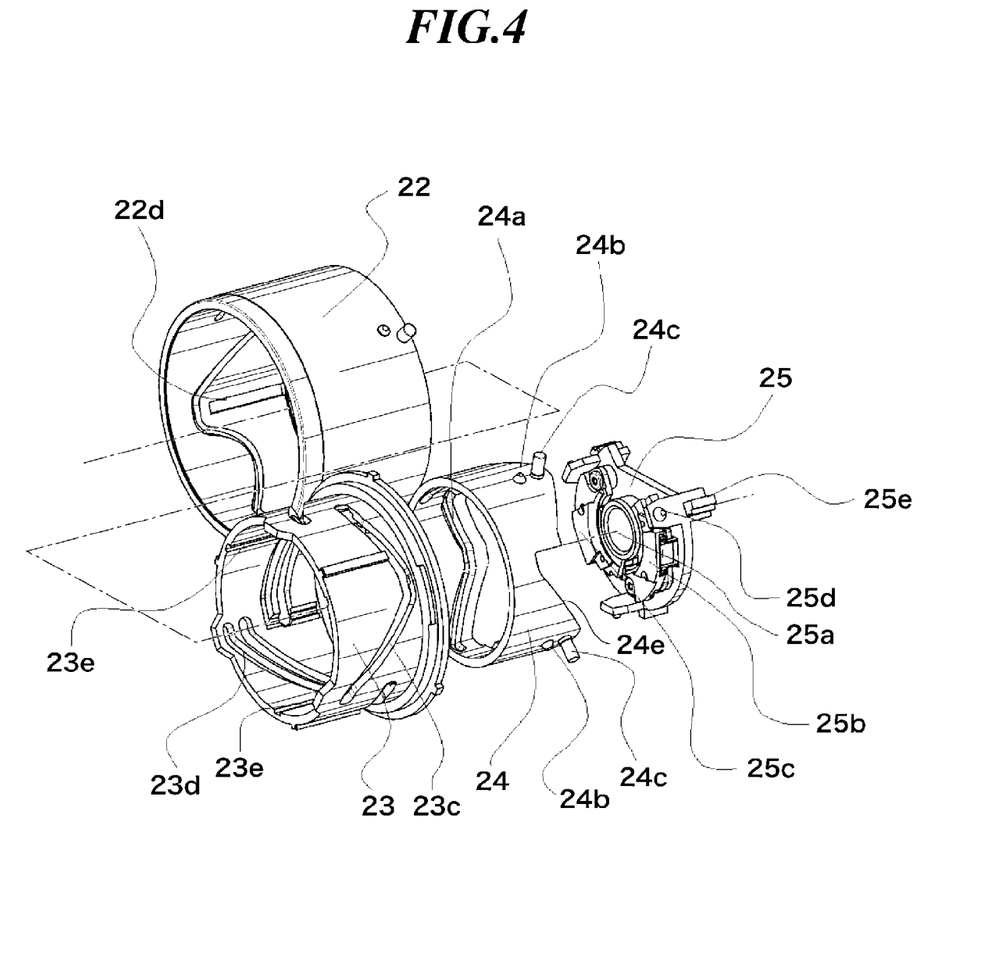
FIG. 4 is an exploded perspective view schematically showing the construction of the cam cylinder, the straight-moving cylinder, a second group drive cylinder and a second group lens holder.

FIG. 4 is an exploded perspective view schematically showing the construction of the cam cylinder 22, the straight-moving cylinder 23, the second group drive cylinder 24 and the second group lens holder 25.

As shown in FIG. 4, in the inner peripheral surface of the second group drive cylinder 24 disposed inside the straight-moving cylinder 23 in the diametral direction, three second group drive cam grooves 24a (rotating cams) in curved form extending in the circumferential direction are formed at generally equal intervals in the circumferential direction. The second group drive cam grooves 24a drive the second group lens holder 25.

On the outer peripheral surface of the second group drive cylinder 24, three cam pins 24b and three drive pins 24c projecting outward in the diametral direction are respectively formed at generally equal intervals in the circumferential direction. The cam pins 24b are slidably engaged with the cam grooves 23d of the straight-moving cylinder 23. The drive pins 24c are slidably engaged with the drive grooves 22d of the cam cylinder 22 by passing through the through holes 23c of the straight-moving cylinder 23 (see FIG. 6). In a portion of the second group drive cylinder 24 at the rear in the optical axis direction, three cutout portions 24e cut in the optical axis direction are formed.

The second group lens holder 25 disposed inside the second group drive cylinder 24 in the diametral direction is provided with second group image pickup lenses 25a (second lens group), a well-known shutter mechanism 25b and a well-known neutral density (ND) mechanism 25c for reducing the quantity of light. On the outer peripheral portions of the second group lens holder 25, three cam pins 25d (first cam followers) and three rotation prohibiting keys 25e (second cam followers) projecting outward in the diametral direction are respectively formed at generally equal intervals in the circumferential direction.

The cam pins 25d and the rotation prohibiting keys 25e are disposed so as to be overlapped with the second group drive cylinder 24 in the diametral direction as seen from the optical axis direction. The cam pins 25d are slidably engaged with the second group drive cam grooves 24a of the second group drive cylinder 24. The rotation prohibiting keys 25e projects outward in the diametral direction through the cutout portions 24e of the second group drive cylinder 24 to slidably engage with the rotation prohibiting cam grooves 23e of the straight-moving cylinder 23 (see FIG. 6).

The fixed cylinder 27, the rotary drive cylinder 28 and the lens barrel cover 29, which are disposed outside the cam cylinder 22 in the diametral direction, will be described in detail with reference to FIG. 5.

Figure 5:
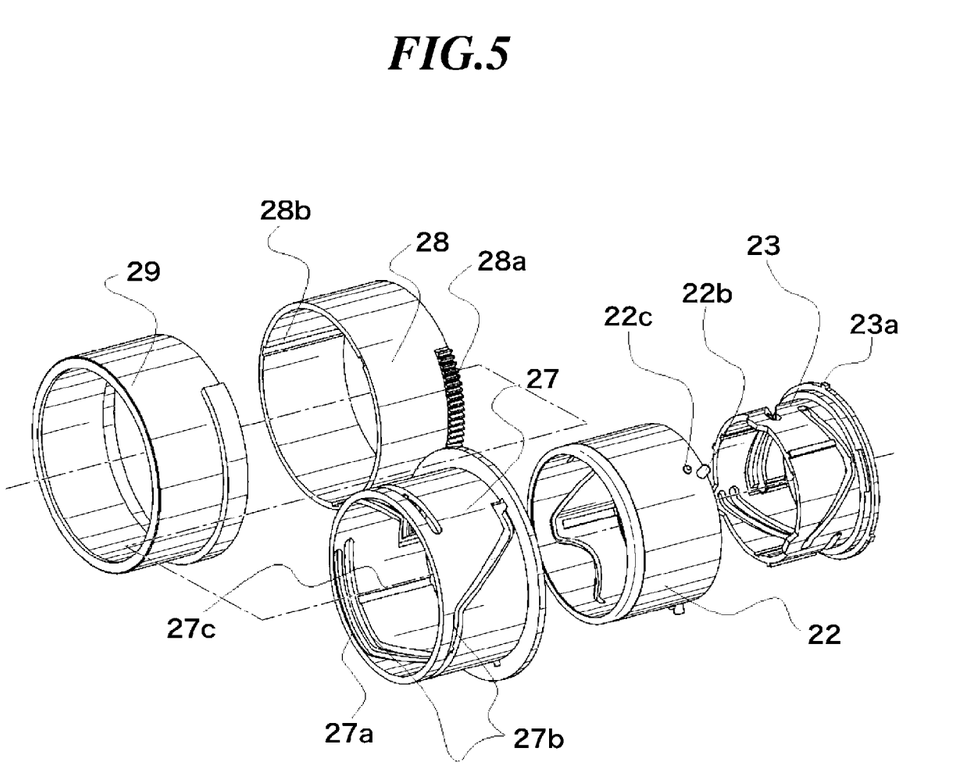
FIG. 5 is an exploded perspective view schematically showing the construction of the cam cylinder, the straight-moving cylinder, a fixed cylinder, a rotary drive cylinder and a lens barrel cover.

FIG. 5 is an exploded perspective view schematically showing the construction of the cam cylinder 22, the straight-moving cylinder 23, the fixed cylinder 27, the rotary drive cylinder 28 and the lens barrel cover 29.

As shown in FIG. 5, in the inner peripheral surface of the fixed cylinder 27 disposed outside the cam cylinder 22 in the diametral direction, three drive cam grooves 27a in curved form extending in the circumferential direction and three rotation prohibiting cam grooves 27c in straight form extending in the optical axis direction are respectively formed at generally equal intervals in the circumferential direction. The drive cam grooves 27a are slidably engaged with the cam pins 22c of the cam cylinder 22. The rotation prohibiting cam grooves 27s are slidably engaged with the rotation prohibiting keys 23a of the straight-moving cylinder 23 to prohibit the straight-moving cylinder 23 from rotating (see FIG. 6).

In the fixed cylinder 27, three through holes 27b in curved from extending in the circumferential direction are formed at equal intervals in the circumferential direction. Since the fixed cylinder 27 is fixed on the base unit 26, the position of the fixed cylinder 27 with respect to the base unit 26 is not changed irrespective of whether the power supply for the camera 1 is on or off.

A gear portion 28a extending in the circumferential direction is formed on the outer peripheral surface of the rotary drive cylinder 28 disposed outside the fixed cylinder 27 in the diametral direction. The gear portion 28a meshes with a lens barrel drive gear train (not shown). Also, three drive grooves 28b in straight form extending in the optical axis direction are formed in the inner peripheral surface of the rotary drive cylinder 28 at equal intervals in the circumferential direction. The drive grooves 28b are slidably engaged with the drive pins 22b of the cam cylinder 22 to cause the cam cylinder 22 to follow the rotation of the rotary drive cylinder 28 (see FIG. 6).

The lens barrel cover 29 disposed outside the rotary drive cylinder 28 in the diametral direction is fixed on the base unit 26 so as to cover the rotary drive cylinder 28.

An operation to extend the lens barrel 20 so that the image pickup optical system is changed from a retracted state to a telephoto state after turning on the power supply for the camera 1 from the off state will be described with reference to FIGS. 6 and 7.

Figure 6:
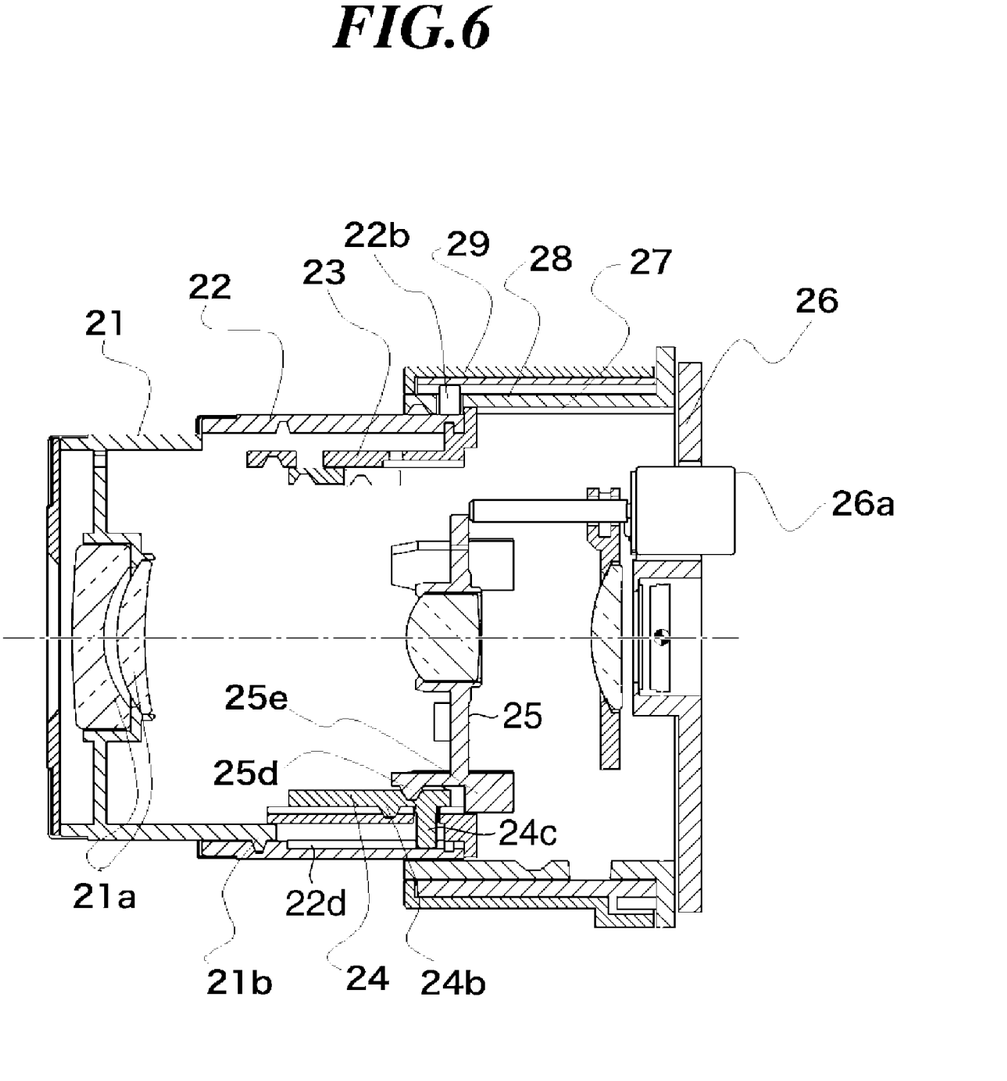
FIG. 6 is a sectional view schematically showing the construction of the lens barrel in a wide angle state corresponding to the minimum of the focal length.

FIG. 6 is a sectional view schematically showing the construction of the lens barrel 20 in a wide angle state corresponding to the minimum of the focal length. FIG. 7 is a sectional view schematically showing the construction of the lens barrel 20 in a telephoto state corresponding to the maximum of the focal length. While the construction of the portions including the drive pins, the cam pins, the cam grooves and the like formed in the various constituent members constituting the lens barrel 20 varies among the components, the portions in the construction are schematically shown in the same forms in FIGS. 6 and 7 for ease of understanding.

Figure 7:
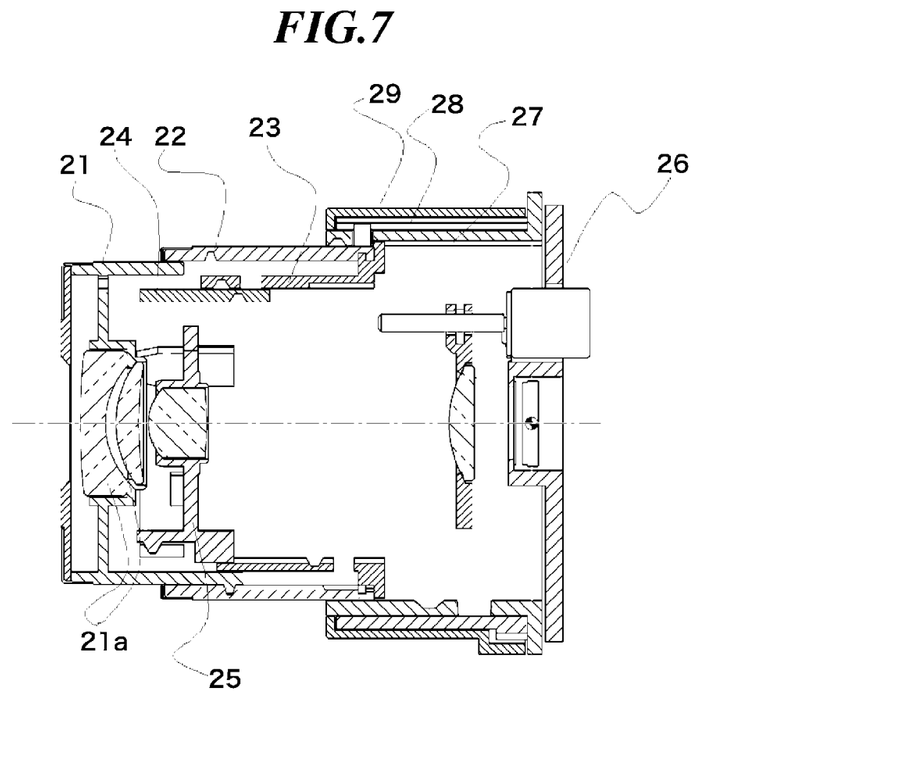
FIG. 7 is a sectional view schematically showing the construction of the lens barrel in a telephoto state corresponding to the maximum of the focal length.

As shown in FIGS. 6 and 7, the second group lens holder 25, the second group drive cylinder 24, the straight-moving cylinder 23, the first group cylinder 21, the cam cylinder 22, the fixed cylinder 27, the rotary drive cylinder 28 and the lens barrel cover 29 are disposed in this order one outside another from the center corresponding to the optical axis indicated by the dot-dash line.

The operation of the rotary drive cylinder 28 will first be described.

When the power supply for the camera 1 is turned on, a lens barrel drive motor (not shown) is first driven to rotate and drive the lens barrel drive gear train (not shown). The lens barrel drive gear train meshes with the gear portion 28a of the rotary drive cylinder 28, as mentioned above. In conjunction with the rotary drive of the lens barrel drive gear train driven by the lens barrel drive motor, the rotary drive cylinder 28 is rotated about the optical axis.

The operation of the cam cylinder 22 will be described.

Since the drive pins 22b of the cam cylinder 22 are engaged with the straight drive grooves 28b of the rotary drive cylinder 28, the cam cylinder 22 rotates by following the rotating operation of the rotary drive cylinder 28. Also, since the cam pins 22c of the cam cylinder 22 are engaged with the drive cam grooves 27a of the fixed cylinder 27 fixed on the base unit 26, the cam cylinder 22 moves in the optical axis direction by following the drive cam grooves 27a while rotating. Thus, the cam cylinder 22 follows the drive cam grooves 27a to be advanced toward the front side in the optical axis direction while rotating about the optical axis by following the rotating operation of the rotary drive cylinder 28.

The operation of the straight-moving cylinder 23 will be described.

Since the straight-moving cylinder 23 is supported by the bayonet structure on the cam cylinder 22, the straight-moving cylinder 23 is advanced toward the front side in the optical axis direction in conjunction with the operation of the cam cylinder 22. At this time, the rotating operation of the straight-moving cylinder 23 is prohibited because the rotation prohibiting keys 23a of the straight-moving cylinder 23 are engaged with the straight rotation prohibiting cam grooves 27c of the fixed cylinder 27. Thus, the straight-moving cylinder 23 follows the advancing operation of the cam cylinder 22 to be linearly advanced toward the front side in the optical axis direction while being prohibited by the rotation prohibiting cam grooves 27c from rotating.

The operation of the first group cylinder 21 will be described.

Since the cam pins 21b of the first group cylinder 21 are engaged with the first group rotation cam grooves 22a of the cam cylinder 22, the first group cylinder 21 is advanced toward the front side in the optical axis direction in conjunction with the operation of the cam cylinder 22. At this time, the rotating operation of the first group cylinder 21 is prohibited because the rotation prohibiting cam grooves 21c of the first group cylinder 21 are engaged with the straight rotation prohibiting keys 23b of the straight-moving cylinder 23. Thus, the first group cylinder 21 follows the first group rotation cam grooves 22a to be linearly advance toward the front side in the optical axis direction while being prohibited by the rotation prohibiting cam keys 23b from rotating.

With this arrangement, the movable distance of the first group cylinder 21 in the optical axis direction is determined by the sum of the movable distance of the cam cylinder 22 in the optical axis direction and the movable distance in the optical axis direction due to following the first group rotation cam grooves 22a of the cam cylinder 22. According to this arrangement, the lens barrier 30 disposed in the front surface of the first group cylinder 21 is not rotated by the operation of the lens barrel 20.

The operation of the second group drive cylinder 24 will be described.

Since the drive pins 24c of the second group drive cylinder 24 are engaged with the straight drive grooves 22d of the cam cylinder 22, the second group drive cylinder 24 rotates by following the rotating operation of the cam cylinder 22. Also, since the cam pins 24b of the second group drive cylinder 24 are engaged with the cam grooves 23d of the straight-moving cylinder 23, the second group drive cylinder 24 moves in the optical axis direction by following the cam grooves 23d while rotating. Thus, the second group drive cylinder 24 follows the cam grooves 23d to be advanced toward the front side in the optical axis direction while rotating about the optical axis by following the rotating operation of the cam cylinder 22.

With this arrangement, the movable distance of the second group drive cylinder 24 is determined by the sum of the movable distance of the cam cylinder 22 in the optical axis direction and the movable distance in the optical axis direction due to following the cam grooves 23d of the straight-moving cylinder 23.

The operation of the second group lens holder 25 will be described.

Since the cam pins 25d of the second group lens holder 25 are engaged with the second group drive cam grooves 24a of the second group drive cylinder 24, the second group lens holder 25 is advanced in the optical axis direction in conjunction with the operation of the second group drive cylinder 24. At this time, the rotating operation of the second lens holder 25 is prohibited because the rotation prohibiting keys 25e of the second lens holder 25 are engaged with the straight rotation prohibiting cam grooves 23e of the straight-moving cylinder 23. Thus, the second group lens holder 25 follows the second group drive cam grooves 24a to be linearly advanced in the optical axis direction while being prohibited by the rotation prohibiting cam groove 23e from rotating.

With this arrangement, the movable distance of the second group lens holder 25 in the optical axis direction is determined by the sum of the movable distance of the cam cylinder 22, the movable distance in the optical axis direction due to following the cam grooves 23d of the straight-moving cylinder 23 and the movable distance in the optical axis direction due to following the second group drive cam grooves 24a of the second group drive cylinder 24.

The above-described arrangement and operations enables driving the first group cylinder 21 and the second group lens holder 25 in the lens barrel 20, for example, from the housed state when the power supply is off to the telephoto state shown in FIG. 7, in which the focal length of the image pickup optical system is at the maximum, via the wide angle state shown in FIG. 6, in which the focal length of the image pickup optical system is at the minimum.

To clarify the specific construction of the lens barrel 20 according to the present invention, the present invention and the related art will be described in comparison with each other with reference to FIGS. 8 to 10.

Figure 8:
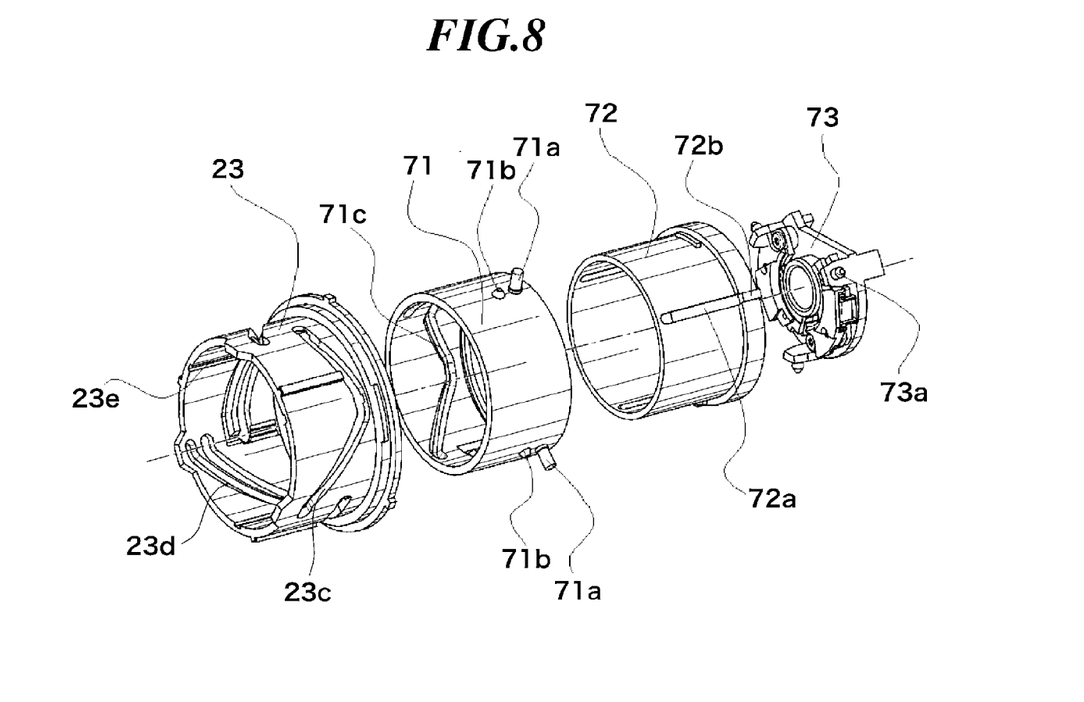
FIG. 8 is an exploded perspective view schematically showing part of constituent members of a conventional lens barrel.

FIG. 8 is an exploded perspective view schematically showing part of constituent members of a conventional lens barrel. A feature of the lens barrel 20 resides in the drive mechanism around the second group lens holder 25. Therefore, only the construction of a straight-moving cylinder corresponding to the straight-moving cylinder 23 belonging to the lens barrel 20 and constituent members disposed inside the straight-moving cylinder in the diametral direction is illustrated in FIG. 8. No description will be made of constituent members disposed outside the straight-moving cylinder in the diametral direction and not illustrated in FIG. 8.

Figure 9:
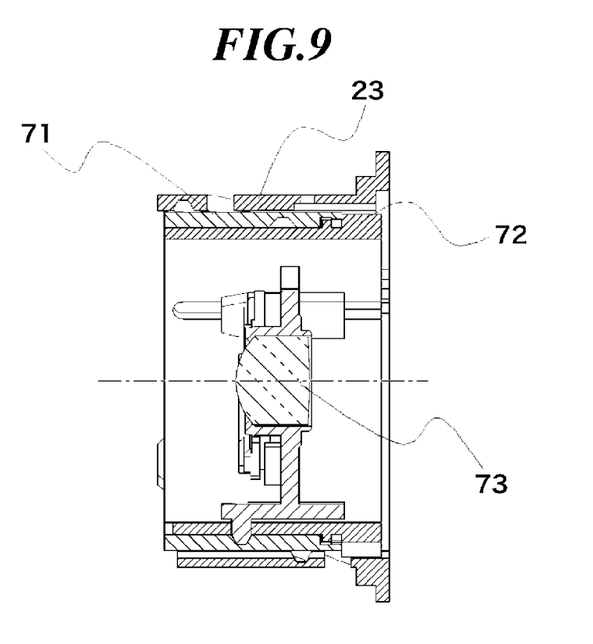
FIG. 9 is a sectional view schematically showing the construction of a straight-moving cylinder and members disposed inside the straight-moving cylinder in the diametral direction in the conventional lens barrel shown in FIG. 8.
Figure 10:
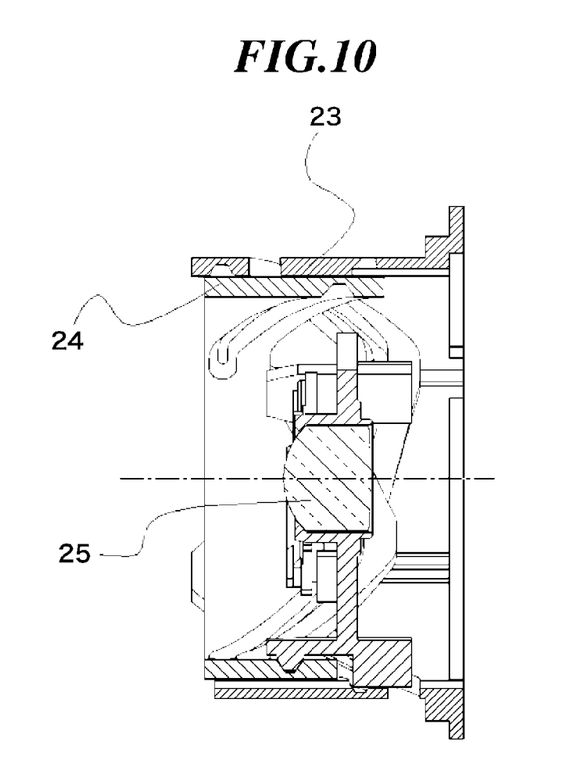
FIG. 10 is a sectional view schematically showing the construction of the straight-moving cylinder and the members disposed inside the straight-moving cylinder in the diametral direction in the lens barrel according to the embodiment of the present invention.

FIG. 9 is a sectional view schematically showing the construction of the straight-moving cylinder and the members disposed inside the straight-moving cylinder in the diametral direction in the conventional lens barrel shown in FIG. 8. FIG. 10 is a sectional view schematically showing the construction of the straight-moving cylinder 23 and the members disposed inside the straight-moving cylinder 23 in the diametral direction in the lens barrel 20 according to the embodiment of the present invention.

In FIG. 8, the straight-moving cylinder 23 belonging to the lens barrel 20 according to the embodiment of the present invention is shown as the conventional straight-moving cylinder for ease of understanding. The lens barrel shown in FIG. 8 includes, as constituent members disposed inside the straight-moving cylinder 23 in the diametral direction, a second group drive cylinder 71, a second straight-moving cylinder 72 disposed inside the second group drive cylinder 71 in the diametral direction, and a second group lens holder 73 disposed inside the second straight-moving cylinder 72 in the diametral direction.

Each of the second group drive cylinder 71 and the second straight-moving cylinder 72 is a circular cylindrical member and is disposed so that the optical axis indicated by a dot-dash line in FIG. 9 coincides with the axial center. The definition of "axial center" is the same as that given with respect to the axial center of the circular cylindrical members constituting the lens barrel 20.

In the inner peripheral surface of the second group drive cylinder 71 disposed inside the straight-moving cylinder 23 in the diametral direction, three second group drive cam grooves 71c in curved form extending in the circumferential direction are formed at generally equal intervals in the circumferential direction. On the outer peripheral surface of the second group drive cylinder 71, three cam pins 71b and three drive pins 71a projecting outward in the diametral direction are formed at generally equal intervals in the circumferential direction, respectively. The cam pins 71b are slidably engaged with the cam grooves 23d of the straight-moving cylinder 23. The drive pins 71a are slidably engaged with the drive grooves of the cam cylinder (not shown) disposed outside the straight-moving cylinder 23 in the diametral direction by passing through the through holes 23c of the straight-moving cylinder 23.

The second straight-moving cylinder 72 disposed inside the second group drive cylinder 71 in the diametral direction is attached to the second group drive cylinder 71 by a bayonet structure. That is, the second straight-moving cylinder 72 forms a unit integrally with the second group drive cylinder 71 and is supported by the second group drive cylinder 71. In the second straight-moving cylinder 72, three straight through holes 72a are formed at generally equal intervals in the circumferential direction. On the outer surface of the end portion of the second straight-moving cylinder 72 at the rear side in the optical axis direction, three rotation prohibiting keys 72b are formed at generally equal intervals in the circumferential direction. The rotation prohibiting keys 72b are slidably engaged with the rotation prohibiting cam grooves 23e of the straight-moving cylinder 23.

On outer peripheral portions of the second group lens holder 73 disposed inside the second straight-moving cylinder 72 in the diametral direction and holding the second lens group, three cam pins 73a projecting outward in the diametrical direction are formed at generally equal intervals in the circumferential direction. The cam pins 73a are slidably engaged with the second group drive cam grooves 71c of the second group drive cylinder 71 by passing through the through holes 72a of the second straight-moving cylinder 72.

The extending operation of this conventional lens barrel will be described.

The second group drive cylinder 71 moves by following the cam grooves 23d through the cam action of the cam pins 71b while rotating about the optical axis by following the rotating operation of the cam cylinder (not shown) disposed outside the straight-moving cylinder 23 in the diametral direction through the cam action of the drive pins 71a. The second group drive cylinder 71 thereby is advanced toward the front side in the optical axis direction.

Since the second group drive cylinder 71 and the second straight-moving cylinder 72 combined into a unit by means of the bayonet structure, the second straight-moving cylinder 72 can move in the optical axis direction by following the operation of the second group drive cylinder 71. At this time, the rotating operation of the second straight-moving cylinder 72 is prohibited because the rotation prohibiting keys 72b of the second straight-moving cylinder 72 are engaged with the rotation prohibiting cam grooves 23e in straight form of the straight-moving cylinder 23 which moves linearly in the optical axis direction. Thus, the second straight-moving cylinder 72 follows the operation of the second group drive cylinder 71 to be linearly advanced forward the front side in the optical axis direction while being prohibited by the rotation prohibiting cam grooves 23e from rotating.

The cam pins 73a of the second lens holder 73 are engaged with the second group drive cam grooves 71c of the second group drive cylinder 71 by passing through the straight through holes 72a formed in the second straight-moving cylinder 72. Therefore the second group lens holder 73 is linearly advanced toward the front side in the optical axis direction by following the second group drive cam grooves 71c while being prohibited by the through holes 72a from rotating.

In this arrangement, the movable distance of the second group lens holder 73 in the optical axis direction is determined by the sum of the movable distance of the cam cylinder in the optical axis direction, the movable distance in the optical axis direction due to following the cam grooves 23d of the straight-moving cylinder 23 and the movable distance in the optical axis direction due to following the second group drive cam grooves 71c of the second group drive cylinder 71.

The above-described arrangement and operations enables, for example, change from the wide angle state in which the focal length of the image pickup optical system is at the minimum to the telephoto state in which the focal length of the image pickup optical system is at the maximum in the conventional lens barrel.

In the related art, the two constituent members: the second group drive cylinder 71 and the second straight-moving cylinder 72 are required inside the straight-moving cylinder in the diametral direction for moving the second group lens holder 73 in the optical axis direction (see FIGS. 8 and 9).

In contrast, in the lens barrel 20 according to the present invention, the second lens holder 25 can be moved in the optical axis direction inside the straight-moving cylinder 23 in the diametral direction by using one constituent member: the second group drive cylinder 24 (see FIG. 10) for the following reason. That is, the lens barrel 20 has such a structure that the cam pins 25d and the rotation prohibiting keys 25e overlap the second group drive cylinder 24 as seen from the optical axis, and the cutout portions 24e are formed in the second group drive cylinder 24. Therefore the rotation prohibiting cam grooves 23e can be engaged with the rotation prohibiting keys 25e through the cutout portions 24e. In this structure, the straight-moving cylinder 23 can prohibit the second group lens holder 25 from rotating. The need for a constituent member such as the second straight-moving cylinder 72 in the conventional lens barrel is thus eliminated.

In the related art, the movable distance of the second group lens holder 73 in the optical axis direction is determined by the sum of the amounts of movement produced by drive of the cam cylinder, the straight-moving cylinder 23 and the second group drive cylinder 71. On the other hand, in the lens barrel 20, the movable distance of the second group lens holder 25 in the optical axis direction is determined by the sum of the amounts of movement produced by drive of the cam cylinder 22, the straight-moving cylinder 23 and the second group drive cylinder 24. In either of the lens barrels, the drive of the cam cylinder, the straight-moving cylinder and the second group drive cylinder relates to the movable distance of the second lens group holder. It can therefore be understood that the movable distance of the second lens group is not influenced by removal of one of the constituent members of the lens barrel.

Thus, the lens barrel 20 according to the embodiment of the present invention can make it possible to reduce the constituent members without degrading the zoom ratio variable function. The amount of play produced among the constituent members can be reduced by the reduction of the constituent members. With this reduction, the amount of play when the lens barrel 20 is driven is reduced, thus improving the accuracy with which the lens barrel 20 is driven. Also, the width of the entire lens barrel 20 in the diametral direction can be reduced by the reduction of the constituent members. The lens barrel 20 can therefore be reduced in size. Further, the manufacturing cost of the lens barrel 20 can be reduced by the reduction of the constituent members.

In the lens barrel 20 according to the embodiment of the present invention, the simple structure in which the drive pins 24c of the second group drive cylinder 24 passes through the through holes 23c of the straight-moving cylinder 23 to be engaged with the drive grooves 22d enables transmission of the rotating operation from the cam cylinder 22 to the second group drive cylinder 24. Thus, the occurrence of play accompanying a complicated structure is prevented to further improve the drive accuracy. Also, component parts of simple structures are used to transmit the rotating operation in the lens barrel 20, so that the manufacturing cost can be reduced.

Further, since the straight-moving cylinder 23 is supported by the bayonet structure on the cam cylinder 22 in the lens barrel 20, the drive of the straight-moving cylinder 23 and the drive of the cam cylinder 22 can be synchronized without using any complicated structure. Therefore, the drive accuracy of the lens barrel 20 can be further improved and the manufacturing cost of the lens barrel 20 can be reduced.

In the lens barrel 20, only the first group rotation cam grooves 22a are formed in the diametral inner surface of the cam cylinder 22 in the circumferential direction and there is no need to form, for example, a cam for driving the second group image pickup lens 25a. As a result, the degree of freedom of drive through the first group rotation cam grooves 22a is improved. The construction of the lens barrel 20 is therefore suitable for an image pickup optical system to which high magnifying power is essential, particularly an image pickup system constituted by three lens groups.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-173271 filed Jul. 2, 2008, which is hereby incorporated by reference herein in its entirety.

What is claimed is:

1. A lens barrel comprising:
    a first cylindrical member fixed;
    a second cylindrical member rotatably disposed inside said first cylindrical member in a diametral direction and capable of moving in an axial direction of an axial center by cam-engaging with said first cylindrical member;
    a third cylindrical member disposed inside said second cylindrical member in a diametral direction and engaging with said first cylindrical member so as not to be rotatable relative to said first cylindrical member, said third cylindrical member being capable of moving in the axial direction of the axial center by the rotation of said second cylindrical member;

a fourth cylindrical member disposed inside said third cylindrical member in a diametral direction, cam-engaging with said third cylindrical member, and engaging with said second cylindrical member so as not to be rotatable relative to said second cylindrical member, said fourth cylindrical member being capable of moving in the axial direction of the axial center by the rotation of said second cylindrical member; and a lens holding member holding an image pickup lens, disposed inside said fourth cylindrical member in a diametral direction, and capable of moving in an axial direction of an optical axis of the image pickup lens by cam-engaging with said fourth cylindrical member and engaging with said third cylindrical member so as not to be rotatable relative to said third cylindrical member.

2. The lens barrel according to claim 1, wherein said lens holding member includes first cam follower and a second cam follower;

said third cylindrical member includes a rotation prohibiting cam groove formed in its inner peripheral surface so as to extend in the axial direction of the axial center; and said fourth cylindrical member includes a rotation cam in curved form formed in its inner peripheral surface so as to extend in its circumferential direction, and wherein the second cam follower and the rotation prohibiting cam groove are slidably engaged with each other to prohibit said lens holding member from rotating, the first cam follower and the rotation cam are slidably engaged with each other, and said fourth cylindrical member rotates about its axial center, whereby said lens holding member moves in the axial direction of the optical axis.

3. The lens barrel according to claim 2, wherein said fourth cylindrical member has a cutout portion such that the second cam follower can project outward in the diametral direction to cam-engage with the rotation prohibiting cam groove.

4. The lens barrel according to claim 1, wherein said third cylindrical member is supported on said second cylindrical member by a bayonet structure.

5. The lens barrel according to claim 1, further comprising:

a first lens group disposed on the optical axis of the image pickup lens and on a subject side; and a second lens group disposed on the optical axis of the image pickup lens and on an image formation surface side.

6. The lens barrel according to claim 5, further comprising:

a fifth cylindrical member holding said first lens group and disposed inside said second cylindrical member in the diametral direction and outside said third cylindrical member in the diametral direction, wherein said fifth cylindrical member cam-engages with said third cylindrical member so as not to be rotatable about its axial center, and cam-engages with said second cylindrical member so as to move in the axial direction of the axial center in conjunction with the operation of said second cylindrical member.

7. The lens barrel according to claim 1, further comprising:

a sixth cylindrical member disposed outside said first cylindrical member in the diametral direction so as to be rotatable about an axial center by a rotating drive force externally applied, wherein said second cylindrical member cam-engages with said sixth cylindrical member so as to rotate by following the rotation of said sixth cylindrical member.

8. An image pickup apparatus comprising the lens barrel according to claim 1.

* * * * *